United States Patent
DeVaul

(10) Patent No.: US 8,174,772 B1
(45) Date of Patent: May 8, 2012

(54) DISPLAY DEVICE WITH INTEGRATED PHOTOVOLTAIC LAYER

(75) Inventor: Richard Wayne DeVaul, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/282,230

(22) Filed: Oct. 26, 2011

(51) Int. Cl.
*G02B 1/06* (2006.01)
*H01L 25/00* (2006.01)

(52) U.S. Cl. ........................ 359/665; 136/243

(58) Field of Classification Search ............ 359/665, 359/666; 136/243, 291
See application file for complete search history.

(56) References Cited

U.S. PATENT DOCUMENTS

| 5,886,688 | A | 3/1999 | Fifield |
|---|---|---|---|
| 7,808,540 | B2 | 10/2010 | Cok |
| 2004/0174610 | A1* | 9/2004 | Aizenberg et al. ........... 359/665 |
| 2010/0079711 | A1 | 4/2010 | Tanaka |
| 2010/0208328 | A1 | 8/2010 | Heikenfeld |
| 2010/0284055 | A1 | 11/2010 | Kothari |
| 2010/0297595 | A1 | 11/2010 | Schietinger |
| 2011/0007056 | A1 | 1/2011 | Huitema |
| 2011/0025668 | A1 | 2/2011 | Huitema |

OTHER PUBLICATIONS

Yang, High reflectivity electrofluidic pixels with zero-power grayscale operation, Applied Physics Letters, Oct. 4, 2010, 143501, vol. 97, No. 14, American Institute of Physics.
Lampert, Large-area smart glass and integrated photovoltaics, Solar Energy Materials & Solar Cells, 2003, 489-499, 76, Elsevier.

* cited by examiner

*Primary Examiner* — William Choi
(74) *Attorney, Agent, or Firm* — McDonnell Boehnen Hulbert & Berghoff LLP

(57) ABSTRACT

A display device with a plurality of electrofluidic display cells may be used to display images to a viewer. The electrofluidic display cell could include a transparent electrowetting electrode and a fluid pathway that includes a viewable fluid channel and a fluid reservoir. The viewable fluid channel in each electrofluidic display cell can be controllably filled with a first or second fluid so as to modulate the viewable contrast, reflectance, and/or color of the cell. A photovoltaic device can be integrated within each electrofluidic display cell directly under the viewable fluid channel. Thus, when ambient light is transmitted through the viewable fluid channel, the photovoltaic device could convert at least some of the ambient light into electrical energy. This electrical energy could be used to power the display device or other devices.

30 Claims, 5 Drawing Sheets

DISPLAY DEVICE WITH INTEGRATED PHOTOVOLTAIC LAYER

BACKGROUND

Image displays can be found throughout everyday life and include computer monitors, televisions, smartphone screens, and billboard advertising. Additionally, low-power displays, such as those found in electronic reader devices have become widespread. Using electrofluidic display technologies, it has become possible to create electronic reader devices with monochrome and color images that exhibit a visual brilliance and contrast that can rival that of conventional printed media. Electrofluidic display cells include a viewable fluid channel that can be filled with various fluids in order to modulate the viewable contrast, reflectance and/or color of the cell.

Photovoltaic (PV) devices generate electrical power by converting light into electric current using semiconducting materials. The use of PV devices has increased due to advances in absorber materials and decreasing production costs, and solar-generated electricity is now part of the electrical power supply in many countries. Additionally, PVs can now be directly incorporated into a wide variety of optical and electrical systems due to their compatibility with semiconductor device fabrication technologies.

SUMMARY

In a first aspect, a display device is provided. The display device includes at least one electrofluidic display cell. The at least one electrofluidic display cell includes at least one transparent electrowetting electrode, a photovoltaic device, and a fluid pathway. The fluid pathway is filled with a first fluid and a second fluid. The fluid pathway includes a viewable fluid channel between the at least one transparent electrowetting electrode and the photovoltaic device. The fluid pathway further includes a fluid reservoir connected to the fluid channel. The display device further includes a voltage source configured to apply a control voltage to the at least one transparent electrowetting electrode, wherein the control voltage controls how much of the viewable fluid channel is filled with the first fluid and the second fluid. The photovoltaic device is configured to provide electrical power to the display device when exposed to ambient light transmitted through the viewable fluid channel.

In a second aspect, a method is provided. The method includes controlling at least one electrofluidic display cell in a display device. The at least one electrofluidic display cell includes at least one transparent electrowetting electrode, a photovoltaic device, and a fluid pathway filled with a first fluid and a second fluid. The fluid pathway includes a viewable fluid channel between the at least one transparent electrowetting electrode and the photovoltaic device. The fluid pathway further includes a fluid reservoir connected to the fluid channel. The method further includes using the photovoltaic device to generate electrical power from ambient light transmitted through the viewable fluid channel and supplying the electrical power from the photovoltaic device to the display device.

In a third aspect, a method is provided. The method includes filling a viewable fluid channel in an electrofluidic display cell receiving ambient light transmitted through the first fluid in the viewable fluid channel. The method further includes the photovoltaic device generating electrical power from the received ambient light and filling the viewable fluid channel with a second fluid.

DETAILED DESCRIPTION

Figure 1:
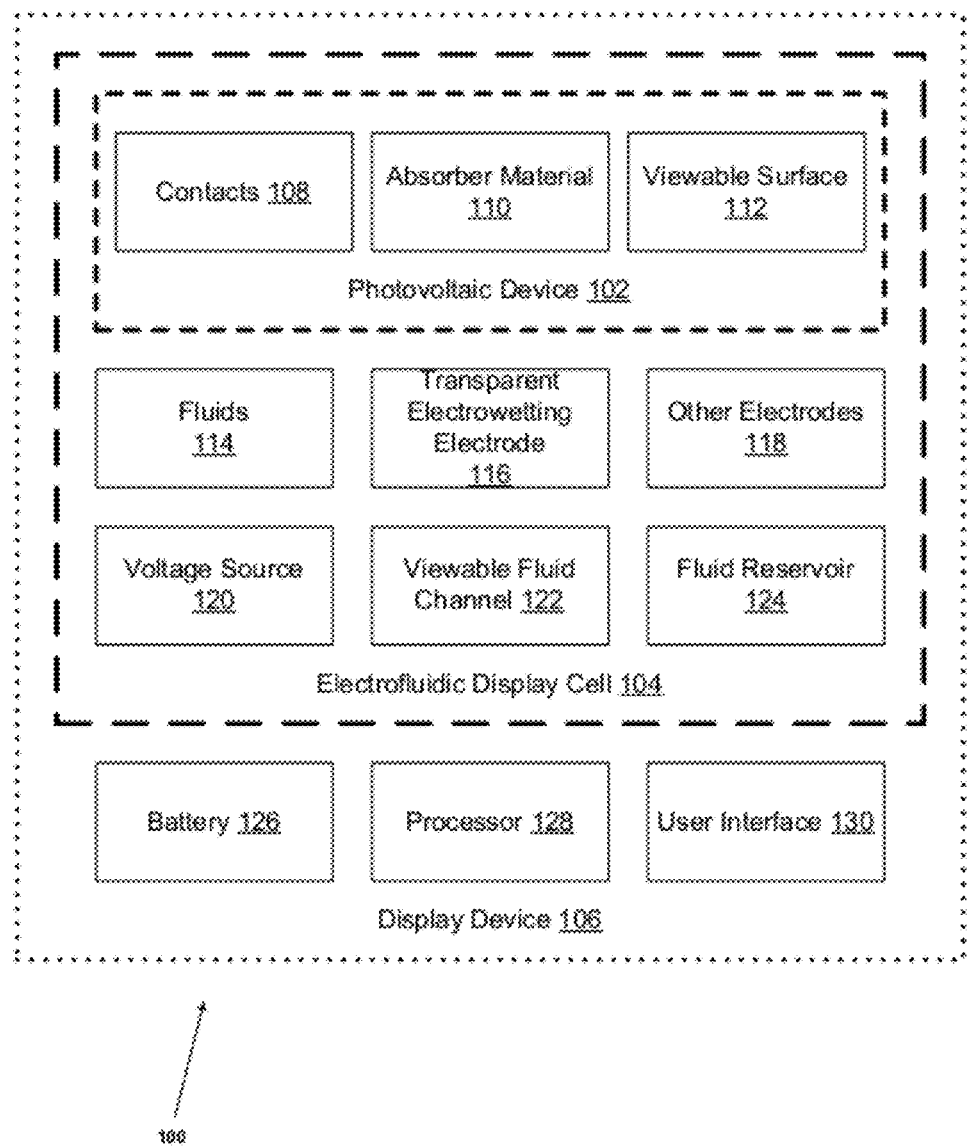
FIG. 1 is a schematic diagram of a display device, in accordance with an example embodiment.

In the following detailed description, reference is made to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

Electrofluidic display (EFD) technology is based on the concept of electrically-switchable fluids. In particular, EFDs can control the electromechanical pressures on various fluids within an electrofluidic cell. In this way, EFDs can controllably hide or reveal the various fluids to provide views of colored pigment dispersions and/or high contrast materials. Further, these views can be adjusted in an analog, 'grayscale' fashion in order to finely control color, contrast, and brightness, among other image display characteristics. Additionally, depending upon the design of the EFD cell, zero-power grayscale operation (i.e. grayscale states maintained with no applied voltage) can be achieved for increased energy efficiency. EFD technology has advanced sufficiently to demonstrate video-rate switching and to incorporate colored pigment dispersions for color displays.

The EFD may include two fluids, one fluid that contains a colored pigment and another fluid that is substantially transparent in the visible wavelengths. A voltage source, which may be controlled by a computer or microcontroller, can switch the EFD between an 'on' state and an 'off' state. While the EFD is in the 'on' state, the colored pigment may be viewable to a viewer. While the EFD is in the 'off' state, the transparent fluid may be viewable to the viewer. Further, the device may be configured to permit an analog or 'grayscale' variation between the two states such that a controllable proportion of the two fluids may be viewable to the viewer.

Finally, depending upon the particular design of the EFD, by removing voltage from the display cell, the proportion and volume of the fluids in the viewable channels may persist.

EFD fluids may include a water-based polar fluid and an oil-based non-polar fluid. In this way, the two fluids may be substantially immiscible. It is also possible to use fluid combinations with more than two fluid or material types, for instance by introducing surfactant materials to the aforementioned two-fluid system in order to form an emulsion. EFD fluid combinations can range widely in composition and depend largely upon the application need. For example, EFD fluid combinations may include contrasting material characteristics, such as: opaque/transparent, reflective/transparent, colored/uncolored (transparent), etc.

Display devices made up of multiple electrofluidic cells may be implemented in a variety of applications such as electronic readers, smart windows and wireless devices. The technology is also known in the art as "e-paper." Companies developing "e-paper" include Gamma Dynamics (Cincinnati, Ohio).

Photovoltaic (PV) devices generate electrical power by absorbing light radiation and converting part of the absorbed photon energy to an electric current that can be driven through an external load. More specifically, in semiconductors, the absorbed energy from photons may cause electrons to be transferred from a valence to a conduction band, which can produce a potential difference between two electrodes on the semiconductor. The potential difference between the two electrodes can be utilized in parallel with a load to generate electrical power.

PV devices can be configured to absorb light in various spectral wavebands, such as the visible, infrared and ultraviolet, depending on the absorber material and other design considerations. A PV device could be further designed to absorb in a broadband fashion or within a narrow band of wavelengths. As such, the word 'transparent' will be understood herein to mean, "substantially transparent within at least the spectral operational range of the PV absorber material." Furthermore, "opaque" will be understood herein to mean, "substantially opaque within at least the spectral operational range of the PV absorber material."

By incorporating a PV device into an electrofluidic display (EFD) cell in a display device, it may be possible to supply electrical power to the display device while the photovoltaic device is exposed to ambient light. A PV device could be positioned directly under the viewable fluid channel of the EFD cell so that when the transparent fluid is at least partially transparent, ambient light could reach the PV device. For instance, as discussed above, the EFD cell may be controllably switched between two digital states (or some intermediate state between the two digital states). When the EFD cell is 'on', colored, substantially opaque, pigment may fill the viewable fluid channel. In this 'on' state, little ambient light may reach the underlying PV device and thus little electrical current may be produced. When the EFD cell is 'off', transparent oil may fill the viewable fluid channel and permit ambient light to illuminate the PV device. In an intermediate state of the EFD cell, a portion of the viewable fluid channel may be opaque and a portion of the viewable fluid channel may be transparent, which may lead to an intermediate amount of electrical power generation.

It is also possible that the PV absorber material may be configured to absorb a wavelength of light outside the visible spectrum. As such, it may be possible for the PV device to generate electrical power regardless of the EFD cell state. For instance, both 'off' and 'on' states could result in fluid compositions in the viewable fluid channel that are at least partially transparent to the designed absorbing wavelength of the absorber material.

Since sunlight is commonly used to generate energy in PV devices, integrating PV devices into EFDs may reduce or eliminate the need for an external power supply for a display device with access to ambient light.

2. Display Device with Electrofluidic Display Cell Apparatus and Integrated Photovoltaic Device FIG. 1 is a schematic diagram of a system 100 that includes a photovoltaic (PV) device 102 that may be incorporated into an electrofluidic display (EFD) cell 104. The EFD cell 104 may further be integrated into a display device 106. The PV device 102 may include contacts 108, absorber material 110, and a viewable surface 112. The EFD cell 104 may further include fluids 114, a transparent electrowetting electrode 116, other electrodes 118, a voltage source 120, a viewable fluid channel 122 and a fluid reservoir 124. The display device 106 may further include a battery 126, a processor 128 and a user interface 130.

The absorber material 110 in the PV device 102 may generally include semiconductor materials and may specifically include silicon, amorphous silicon, germanium, silicon germanium, gallium arsenide, gallium nitride, indium antimonide, silicon nanowires, silicon-germanium nanowires, vanadium oxide, or other light-absorbing materials and combinations thereof known in the art.

The contacts 108 may include known metal conductive materials, such as aluminum, gold, titanium, platinum, and copper and combinations thereof. The contacts 108 may additionally and/or alternatively include various metal-semiconductor silicides, such as AlSi, $TiSi_2$, and $WSi_2$, to name a few compositions. Other known contact materials for the contacts 108 may be implemented depending on the absorber material 110.

The contacts 108 may further include transparent conducting oxides (TCOs) like indium tin oxide (ITO), or other substantially transparent conducting materials, such as conductive polymers. The contacts 108, due to various design considerations, may alternatively or additionally include Schottky barrier contacts, the materials of which are well-known in the art and depend upon the absorber material 110.

The photovoltaic device 102 may be incorporated into the EFD cell 104. The viewable surface 112 is the surface of the photovoltaic device 102 substantially viewable to an external viewer of the EFD cell 104. When the viewable surface 112 is exposed to ambient light, the absorber material 110 may absorb photons and generate a potential difference between the PV device contacts 108. The contacts 108 can thus provide electrical power to a parallel load.

Within the EFD cell 104, the fluids 114 may include various polar and non-polar fluids as well as surfactants and other additives. In an example embodiment, the EFD cell 104 includes two fluids, a first fluid, which may be a non-polar, transparent oil and a second fluid, which may be a polar, opaque pigment dispersion. Other combinations of fluids are possible. For instance, it may be desirable to optimize the reflectance contrast property in an EFD cell over a color characteristic. Therefore, in this example, a combination of fluids may include a transparent non-polar fluid, which may cause a non-reflective surface to be visible to a viewer of the EFD cell and a highly reflective polar fluid. One skilled in the art will understand that many fluid materials are possible and the exact fluids used in the EFD cell may depend at least upon the design of particular EFD cells and the display devices.

In an example embodiment, the transparent electrowetting electrode 116 may include several layers including, but not limited to, a physical substrate such as plastic, polymer, or glass, a transparent conductive film such as indium tin oxide (ITO), and a polymer coating such as Parylene or SU-8 photoresist. The combination of layers in the transparent electrowetting electrode 116 is substantially transparent, such that an underlying viewable surface 112 of the PV device may be exposed to ambient light. The transparent conductive film may be discontinuous or patterned to form electrodes at desired pixel locations. Alternatively, the transparent conductive film may be a continuous conducting sheet. The polymer coating may cause the surface to be hydrophobic. The transparent electrowetting electrode 116 may be connected to a voltage source 120.

Other electrodes 118 may be included in the EFD cell 104. The other electrodes 118 may be substantially hidden from view. For instance, the other electrodes 118 may include a bottom electrowetting electrode that may be located under the absorbing material 110. The other electrodes 118 may form a continuous sheet or they could be discontinuous. For instance, a display device 106 may include a plurality of EFD cells 104, each of which may function as a display pixel, arranged in an array and the other electrodes 118 may be patterned to form a bottom electrode for each pixel, or for a subset of pixels. The other electrodes 118 may be connected to ground or could be connected to a voltage source 120.

The voltage source 120 may represent a single voltage source or several voltage sources. The voltage source(s) 120 could be connected to individual EFD cells 104. The voltage waveforms provided could be controlled by the processor 128 of a display device 106. In one embodiment, the voltages provided by the voltage source 120 could range from around −20V to +20V. Specifically, the −20V level could be used to fill the fluid channel 122 with a first fluid and the +20V level could be used to fill the fluid channel 122 with a second fluid. The zero voltage level could be used to maintain an existing fluid distribution in the EFD cell. The voltage waveform could be a sine wave, square wave, sawtooth pattern or other voltage pattern designed to control the fluid composition of the fluid channel 122. Those skilled in the art will understand that other voltage levels and waveforms are possible and may depend upon at least the particular design of the EFD cells 104 and the voltage source 120. The refresh rate of the voltage waveform could be designed around National Television System Committee (NTSC) video rates (at least 60 frames per second).

The viewable fluid channel 122 includes the volume substantially between the photovoltaic device 102 and the transparent electrowetting electrode 116. Fluids 114 in the viewable fluid channel 122 may be substantially viewable to the outside world from through the transparent electrowetting electrode 116. In one embodiment, the dimensions of the viewable fluid channel 122 could be around 30×30×15 μm. The fluid reservoir 124 may be located between the photovoltaic device 102 and the other electrodes 118 and may be substantially hidden from view. The fluids 114 in the fluid reservoir 124 may be substantially hidden from view. The display device 106 may control the fluid composition in the viewable fluid channel 122 and the fluid reservoir 124 by controlling the voltage source 120.

The display device 106 may include a battery 126 that could supply power to at least the display device 106, including the EFD cell(s) 104. The battery 126 could be a rechargeable lithium-ion battery or other battery type known in the art. The photovoltaic device 102 in EFD cell 104 could be configured to recharge battery 126 when the photovoltaic device 102 is exposed to ambient light.

The display device 106 could further include a processor 128 that could represent a computer or a microcontroller configured to control the EFD cell(s) 104. Additionally, the display device 106 may include a user interface 130. The user interface 130 could represent software and hardware necessary to provide a graphical user interface to a viewer of the display device 106. For instance, the user interface 130 could be a combination of a display screen made up of EFD cells 104 and software designed to control the display screen.

Figure 2A:
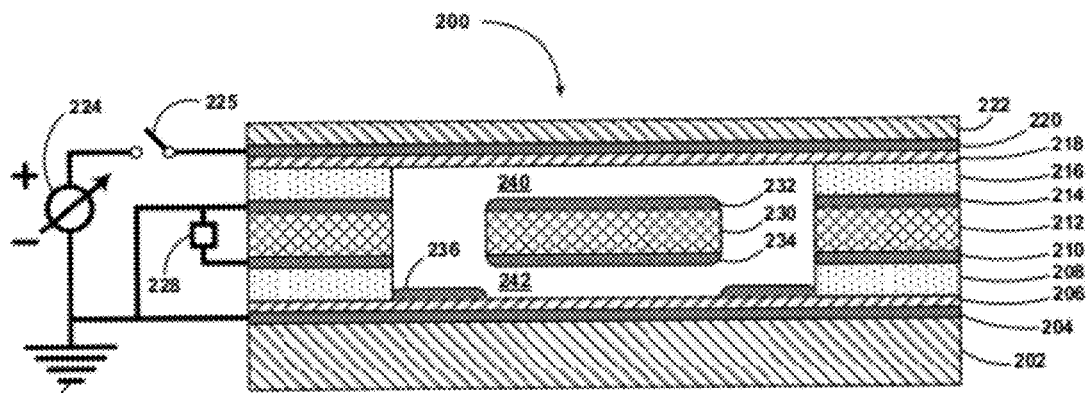
FIG. 2A is a side cross-section view of an electrofluidic display cell without fluids, in accordance with an example embodiment.

FIG. 2A is a cross-sectional view of an electrofluidic display (EFD) cell 200 without fluids. One skilled in the art will understand that the exact combination of layers, thicknesses and materials in the EFD cell 200 could vary from the example embodiment detailed below. The EFD cell 200 could include a substrate 202. In an example embodiment, substrate 202 is glass, but substrate 202 could alternatively represent plastic, polymethylmethacrylate (PMMA), silicon or other substrate materials known in the art. Substrate 202 could further be a flexible material, which may enable the EFD cell 200 and display device 106 to be pliable.

A bottom electrically-conductive material 204 may be applied to substrate 202. This bottom electrically-conductive material 204 could represent other electrodes 118 and could, for example, include a conductive metal known in the art. The material could further be a transparent conductor, such as indium tin oxide (ITO) or a conductive polymer.

A bottom polymeric layer 206 could be applied to the bottom electrically-conductive material 204. The bottom polymeric layer 206 could include materials such as SU-8 photoresist and/or Parylene, and could be configured to make the fluid reservoir 242 substantially hydrophobic. Bottom polymeric layer 206 and bottom electrically-conductive layer 204 could represent the same material, for instance if the layers include a polymer that is both substantially hydrophobic and conductive.

A bottom insulating layer 208 may cover portions of the bottom polymeric layer 206. The bottom insulating layer 208 could be a photo-patternable resist material, such as SU-8, AZ-5214, or PMMA. The bottom insulating layer 208 could further be photo-patterned and etched to form a fluid reservoir 242 and to provide access to bottom electrically-conductive layer 204. The bottom insulating layer 208 may be fabricated above the bottom polymeric layer 206 and may be configured to form the height of fluid reservoir 242. The bottom insulating layer 208 could serve to insulate the bottom electrically-conductive layer 204 from the bottom contact 234 of the photovoltaic device 230. The bottom insulating layer 208 could be deposited using a spinner procedure and the height of the material could depend upon the spinning revolutions per minute. Other materials or material combinations may be possible. In one embodiment, the thickness of the bottom insulating layer, and thus the height of the fluid reservoir 242, could be approximately five microns.

A bottom contact 210 and 234 for the photovoltaic device could be deposited on top of the bottom insulating layer 208. The bottom contact 210 and 234 could include conductive metals known in the art or other transparent, opaque conductors, or combinations thereof.

Absorber material 212 could include materials such as amorphous silicon, silicon, germanium, silicon/germanium, carbon nanotubes, gallium arsenide, indium antimonide or other semiconductor materials known in the art. The absorber material 212 could be patterned and etched to define the photovoltaic device material 230. The absorber material 212 could further be implanted with various dopants in order to form a P-N junction in the material. The doped areas of the absorber material could be selectively controlled using an implant mask, for example. Alternatively, absorber material 212 could be applied in successive layer depositions, such as in quantum well or superlattice layers, with different dopant compositions in order to form a P-N junction. Furthermore, multiple P-N junctions could be stacked in a 'pile' arrangement known in the art. In an example embodiment, the absorber material 212 is approximately five microns thick.

A top contact 214 and 232 for the photovoltaic device could be deposited on the absorber material 212. The top contact 214 and 232 may include a transparent conductive material such as indium tin oxide or other transparent contact material known in the art. The top contact 214 and 232 could be patterned using photolithography and etched. Alternatively, the top contact 214 and 232 could be deposited in a self-aligned fashion. Residual material 236 may be the result of such a self-aligned process.

A top insulating layer 216 could be deposited on the top contact 232. The thickness of the top insulating layer 216 could substantially define the vertical height of the viewable fluid channel 240. The top insulating layer 216 could be a photo-patternable material such as photoresist. The top insulating layer 216 could be similar to the bottom insulating layer 208 in composition and thickness.

A transparent lid could cover at least the aforementioned parts of the EFD cell 200. The transparent lid could include a top polymer layer 218, which may be similar to the bottom polymer layer 206. The top polymer layer 218 could be configured to make at least a portion of the viewable fluid channel substantially hydrophobic. The transparent lid could further include a top electrically-conductive material 220, which may be a transparent conductor such as indium tin oxide. Additionally, a top lid 222 may be connected to the top electrically-conductive material 220. The top electrically-conductive material 220 could be patterned, for instance, to provide different voltages to each EFD cell or to different portions of each EFD cell. The top lid 222, could be fabricated from glass, plastic, polymer or other substantially transparent material known in the art. The top lid 222 may provide substantial physical support for the combination of the top lid 222, top electrically-conductive material 220 and top polymer layer 218, which may be considered together as a transparent electrowetting electrode. Between the transparent electrowetting electrode and the underlying layers of the EFD cell 200, an epoxy or similar material may be introduced to seal the fluids 114 into each EFD cell 104 of the display device 106.

Voltage source 224 could be a variable voltage source and could be selectively applied to top electrically-conductive material 220 via a switch 225. Switch 225 could be a switching network (not shown) configured to control the applied voltage to a plurality of EFD cells 104 in a display device 106. The voltage source 224, switch 225 and/or switching network could be controlled by a processor 128.

As described above, the photovoltaic device material 212 may be configured to absorb ambient light. Light absorbed by the photovoltaic device material 230 may be converted to electrical energy and subsequently be used to supply electrical power to a parallel load 228. Parallel load 228 could represent any component of display device 106 that consumes electrical power or a charging system in display device 106, (e.g., a charging system for charging battery 126).

Figure 2B:
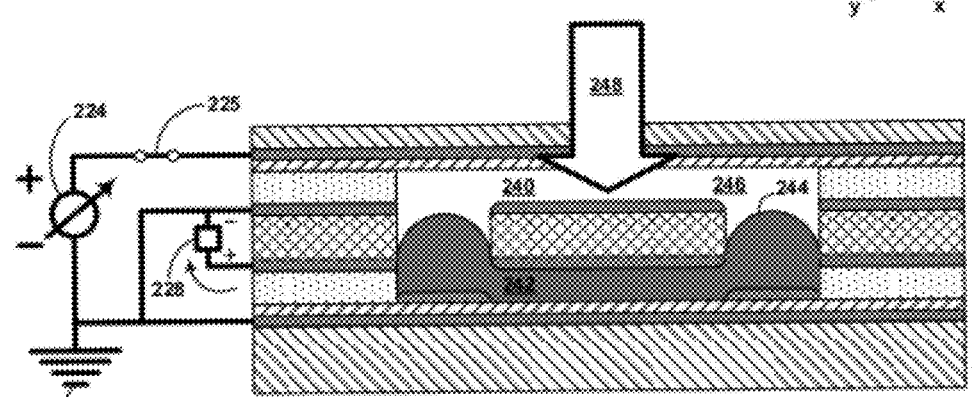
FIG. 2B is a side cross-section view of an electrofluidic display cell where ambient light is incident on an integrated photovoltaic device, in accordance with an example embodiment.
Figure 2C:
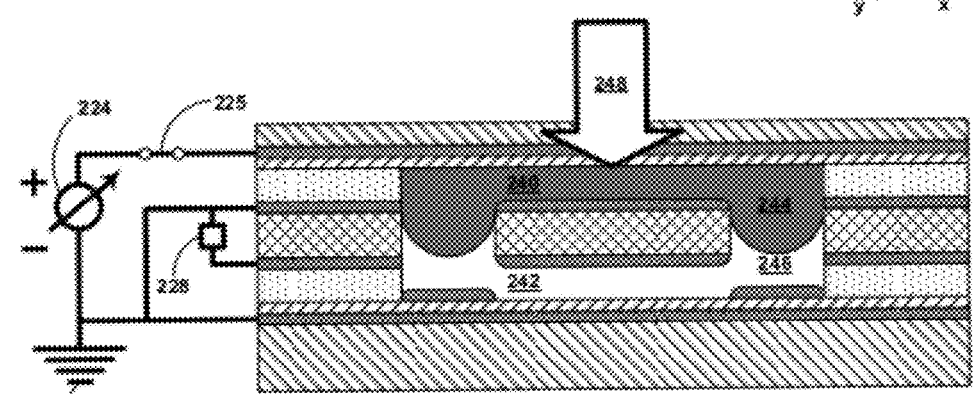
FIG. 2C is a side cross-section view of an electrofluidic display cell where ambient light is blocked from an integrated photovoltaic device, in accordance with an example embodiment.

FIGS. 2B and 2C are cross-sectional views of the EFD cell 200 depicted in FIG. 2A. FIG. 2B shows a configuration of the EFD cell 200 in which a transparent fluid 246 fills the viewable fluid channel 240. The transparent fluid 246 could be a transparent oil. In this configuration, ambient light is able to reach the photovoltaic device material 230. In this example embodiment, voltage source 224 is configured to provide a voltage to top electrically-conductive material 220 that causes a transparent fluid 246 to substantially fill the viewable fluid channel 240. Ambient light 248 is able to reach the photovoltaic device material 230 through the transparent lid and transparent fluid 246. Electrical power generated by the absorption of ambient light 248 by photovoltaic device material 230 may be provided to parallel load 228.

FIG. 2C depicts a configuration of the EFD cell 200 in which an opaque fluid 244 substantially fills viewable fluid channel 240. In the example embodiment, voltage source 224 is configured to provide a voltage that causes the opaque fluid 344 to move into the viewable fluid channel 240. The opaque fluid 344 could be a water-based dispersion of pigment. The opaque fluid 244 may substantially block ambient light 248 from reaching the photovoltaic device material 230. As a result, photovoltaic device material 230 may stop generating electrical power when viewable fluid channel 240 is filled with opaque fluid 244.

Figure 2D:
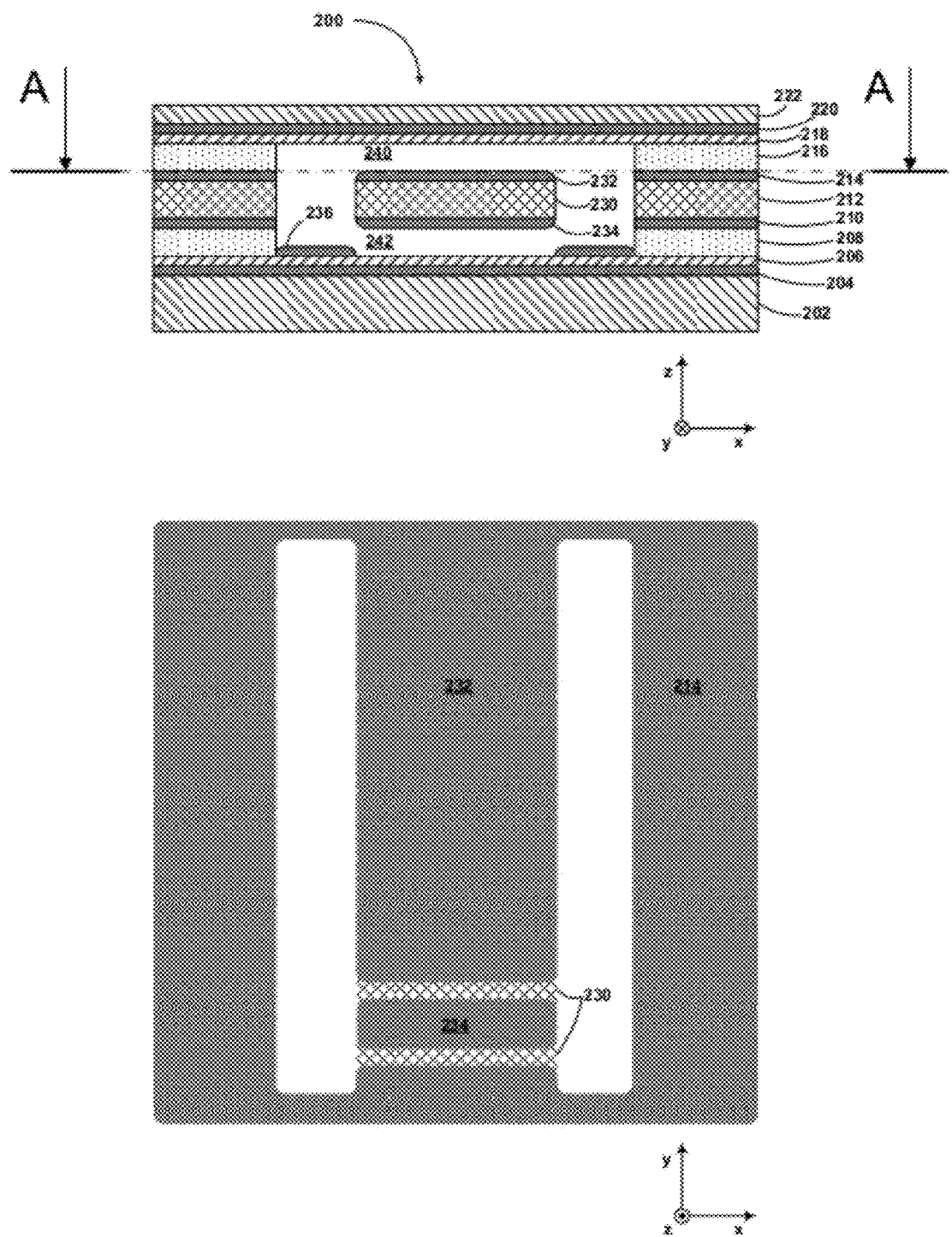
FIG. 2D is a side cross-section view and a top cutaway view of an electrofluidic display cell in accordance with an example embodiment.

FIG. 2D shows a cutaway showing an example embodiment of an EFD cell 200 from the top. Specifically, top contact 214 and 232 could be configured as a ground plane. Bottom contact 234 could be used as a bond location for an electrical connection. A parallel load 228 could be placed between the bottom contact 234 and top contact 214 and 232. Absorber material 230 shown in FIG. 2D may represent the sloped sidewalls of absorber material 230 after etching to reveal the bottom contact 234.

Figure 3:
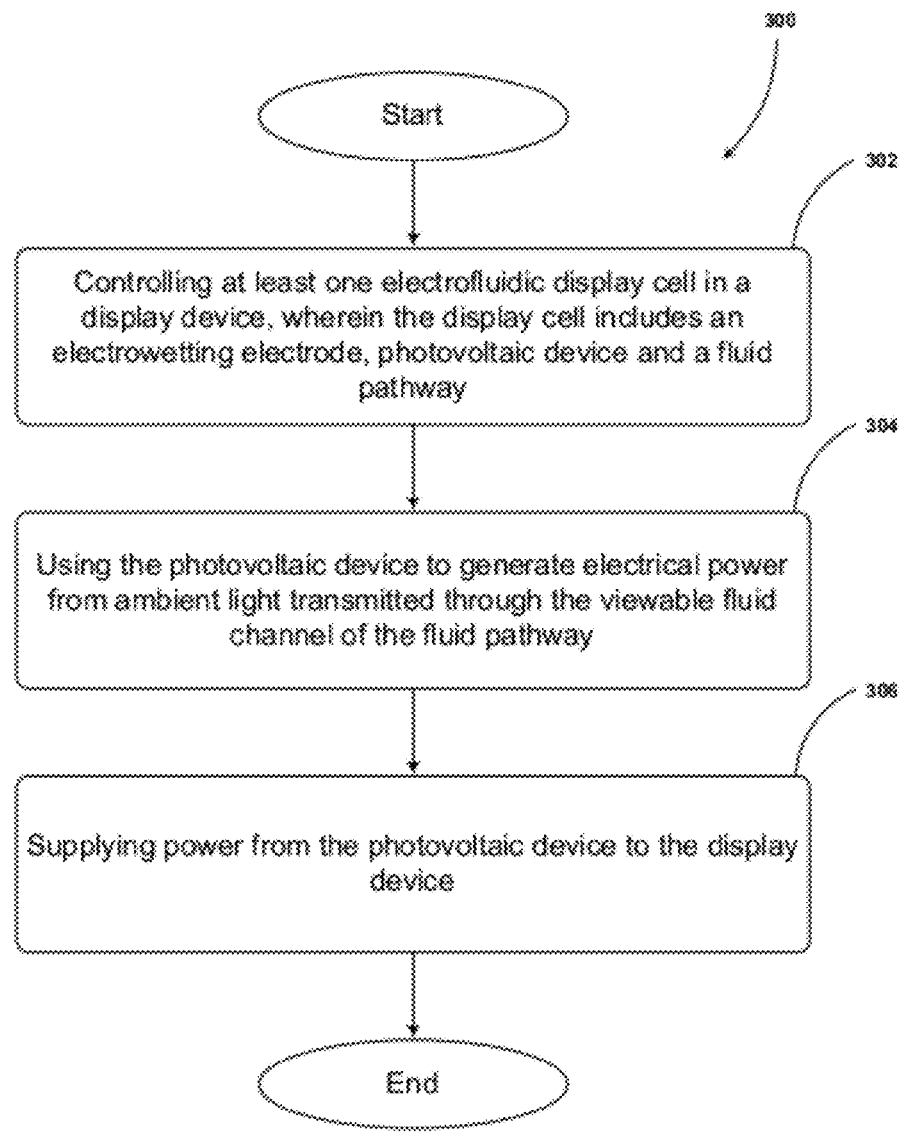
FIG. 3 is a flowchart illustrating a method, in accordance with an example embodiment.

3. Method for Controlling an Electrofluidic Display Cell in a Display Device and Using an Integrated Photovoltaic Device to Supply Electrical Power to the Display Device FIG. 3 illustrates a method 300 for using an electrofluidic display cell with an integrated photovoltaic device. FIG. 3 illustrates the main elements of the method, however, it is understood that the steps may appear in a different order and steps may be added or subtracted. For purposes of illustration, FIG. 3 is described with reference to system 100 shown in FIG. 1. It is to be understood, however, that other systems could be used.

The method includes controlling at least one electrofluidic display (EFD) cell in a display device, as indicated in block 302. The EFD cell could include a transparent electrowetting electrode, a photovoltaic device and a fluid pathway, which may further include a viewable fluid channel and a fluid reservoir. For example, control of the EFD cell could include processor 128 adjusting voltage source 120 to provide an applied voltage to electrofluidic display cell 104. Moreover, processor 128 could control a plurality of respective EFD cells in display device 106 to display a desired image.

The method may further include using the photovoltaic device to generate electrical power from ambient light transmitted through the viewable fluid channel of the fluid pathway, as indicated by block 304. For example, the applied voltage from voltage source 120 may induce fluids 114 within the EFD cell to fill the viewable fluid channel 122 such that ambient light 248 is transmitted to an absorber material 110 of a photovoltaic device 102. The ambient light 248 may be absorbed by the absorber material 110 of the photovoltaic device 102 to form a potential difference between two contacts 108 of the photovoltaic device 102, and may thereby generate electrical power.

Additionally, the method may include supplying power from the photovoltaic device to the display device, as indicated by block 306. For instance, a load in the display device 106 could be connected in parallel to the contacts 108. The potential difference formed between the two contacts 108 may supply power to the load in display device 106. Such power may be used to recharge the battery 126 of the display device 106 or could be used to directly power the electrofluidic display cell 104 and/or other components of display device 106.

Figure 4:
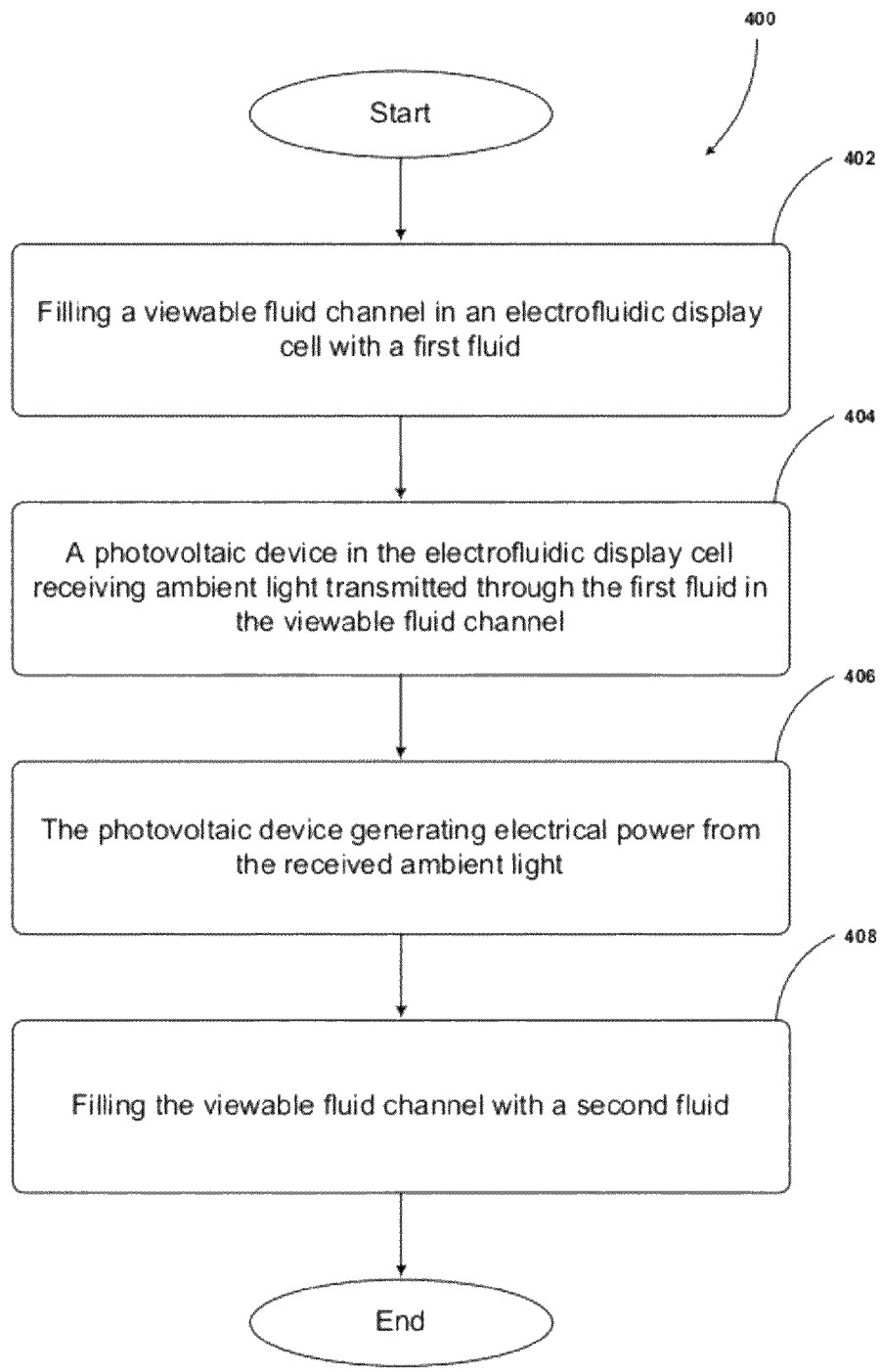
FIG. 4 is a flowchart illustrating a method, in accordance with an example embodiment.

4. Method for Filling a Viewable Fluid Channel and Generating Electrical Power in an Electrofluidic Display Cell FIG. 4 illustrates a method 400 for filling a viewable fluid channel of an electrofluidic display cell with a first and second fluid and generating electrical power from the electrofluidic display cell. FIG. 4 illustrates the main elements of the method, however, it is understood that the steps may appear in a different order and steps may be added or subtracted.

A viewable fluid channel of an electrofluidic display may be filled with a first fluid, as shown in block 402. The first fluid could include, for example, a transparent fluid, such as an oil.

A photovoltaic device in the electrofluidic cell may receive ambient light that is transmitted through the first fluid in the viewable fluid channel as shown in block 404.

The photovoltaic device may generate electrical power from the received ambient light as shown in block 406.

The viewable fluid channel may be filled with a second fluid as shown in block 408. The second fluid may include a fluid with a pigment dispersion. Additionally, if the second fluid is opaque, ambient light may not be transmitted through the viewable fluid channel. Thus, the photovoltaic device may stop generating electrical power when the viewable fluid channel is filled with the second fluid.

The method 400 could be performed with a plurality of electrofluidic display cells such that desired images could be generated using a display device.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A display device, comprising:
   at least one electrofluidic display cell, wherein the at least one electrofluidic display cell comprises:
   (a) at least one transparent electrowetting electrode;
   (b) a photovoltaic device; and
   (c) a fluid pathway filled with a first fluid and a second fluid, wherein the fluid pathway comprises a viewable fluid channel between the at least one transparent electrowetting electrode and the photovoltaic device and a fluid reservoir connected to the fluid channel; and
   a voltage source configured to apply a control voltage to the at least one transparent electrowetting electrode, wherein the control voltage controls how much of the viewable fluid channel is filled with the first fluid and the second fluid, and wherein the photovoltaic device is configured to provide electrical power to the display device when exposed to ambient light transmitted through the viewable fluid channel.

2. The display device of claim 1, wherein the first fluid is transparent to a portion of the visible spectrum.

3. The display device of claim 1, wherein the second fluid is opaque to a portion of the visible spectrum.

4. The display device of claim 1, wherein the first fluid comprises an oil.

5. The display device of claim 1, wherein the second fluid comprises a pigment dispersion.

6. The display device of claim 1, wherein the first fluid is configured to substantially transmit visible light.

7. The display device of claim 1, wherein the second fluid is configured to substantially reflect visible light.

8. The display device of claim 1, wherein the fluid pathway comprises a polymeric surface configured to be electrowettable.

9. The display device of claim 1, wherein the at least one transparent electrowetting electrode is substantially transparent to visible light and wherein a surface of the at least one transparent electrowetting electrode adjacent to the fluid pathway comprises a substantially electrowetting material.

10. The display device of claim 1, wherein the photovoltaic device is a thin film solar cell.

11. The display device of claim 10, wherein the thin film solar cell comprises an amorphous silicon layer configured to absorb visible light.

12. The display device of claim 1, wherein the photovoltaic device comprises a material configured to absorb infrared light.

13. The display device of claim 1, wherein the photovoltaic device is between the viewable fluid channel and the fluid reservoir.

14. A method, comprising:
   controlling at least one electrofluidic display cell in a display device, wherein the at least one electrofluidic display cell comprises:
   a) at least one transparent electrowetting electrode;
   b) a photovoltaic device; and
   c) a fluid pathway filled with a first fluid and a second fluid, wherein the fluid pathway comprises a viewable fluid channel between the at least one transparent electrowetting electrode and the photovoltaic device and a fluid reservoir connected to the fluid channel; and
   using the photovoltaic device to generate electrical power from ambient light transmitted through the viewable fluid channel; and
   supplying the electrical power from the photovoltaic device to the display device.

15. The method of claim 14, wherein the first fluid is transparent to a portion of the visible spectrum.

16. The method of claim 14, wherein the second fluid is opaque to a portion of the visible spectrum.

17. The method of claim 14, wherein the first fluid comprises an oil.

18. The method of claim 14, wherein the second fluid comprises a pigment dispersion.

19. The method of claim 14, wherein the first fluid is configured to substantially transmit visible light.

20. The method of claim 14, wherein the second fluid is configured to substantially reflect visible light.

21. The method of claim 14, wherein the fluid pathway comprises a polymeric surface configured to be electrowettable.

22. The method of claim 14, wherein the at least one transparent electrowetting electrode is substantially transparent to visible light and wherein a surface of the at least one transparent electrowetting electrode adjacent to the fluid pathway comprises a substantially electrowetting material.

23. The method of claim 14, wherein the photovoltaic device is a thin film solar cell.

24. The method of claim 23, wherein the thin film solar cell comprises an amorphous silicon layer configured to absorb visible light.

25. The method of claim 14, wherein the photovoltaic device comprises a material configured to absorb infrared light.

26. The method of claim 14, wherein the photovoltaic device is between the viewable fluid channel and the fluid reservoir.

27. A method, comprising:
- filling a viewable fluid channel in an electrofluidic display cell with a first fluid;
- a photovoltaic device in the electrofluidic display cell receiving ambient light transmitted through the first fluid in the viewable fluid channel;
- the photovoltaic device generating electrical power from the received ambient light; and
- filling the viewable fluid channel with a second fluid.

28. The method of claim 27, wherein the first fluid is transparent to a portion of the visible spectrum.

29. The method of claim 27, wherein the second fluid is opaque to a portion of the visible spectrum.

30. The method of claim 27, wherein the photovoltaic device stops generating electrical power when the viewable fluid channel is filled with the second fluid.

* * * * *